(12) United States Patent
Song et al.

(10) Patent No.: US 11,947,841 B2
(45) Date of Patent: Apr. 2, 2024

(54) MANAGING ADDRESS ACCESS INFORMATION

(71) Applicant: Micron Technology, Inc., Boise, ID (US)

(72) Inventors: Keun Soo Song, Meridian, ID (US); Hyunyoo Lee, Boise, ID (US); Kang-Yong Kim, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 2 days.

(21) Appl. No.: 17/586,534

(22) Filed: Jan. 27, 2022

(65) Prior Publication Data

US 2022/0398042 A1 Dec. 15, 2022

Related U.S. Application Data

(60) Provisional application No. 63/210,897, filed on Jun. 15, 2021.

(51) Int. Cl.
*G06F 3/06* (2006.01)
(52) U.S. Cl.
CPC .......... *G06F 3/0659* (2013.01); *G06F 3/0602* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 7,437,597 B1* | 10/2008 | Kruckemyer | ....... | G06F 11/1064 714/6.11 |
| 9,715,455 B1* | 7/2017 | Purkayastha | ....... | G06F 12/0815 |
| 2004/0210722 A1* | 10/2004 | Sharma | ............... | G06F 12/0817 711/E12.027 |
| 2007/0226425 A1* | 9/2007 | Caprioli | .............. | G06F 11/1064 711/143 |
| 2012/0079350 A1* | 3/2012 | Krick | .................... | H03M 13/05 714/763 |
| 2015/0074493 A1* | 3/2015 | Kajigaya | ............. | G06F 11/1068 714/764 |
| 2016/0110250 A1* | 4/2016 | Han | ..................... | G06F 11/1064 714/766 |
| 2016/0357632 A1* | 12/2016 | d'Abreu | ............. | G06F 11/1072 |
| 2018/0069658 A1* | 3/2018 | Benisty | ................. | H03M 13/15 |
| 2022/0075561 A1* | 3/2022 | Peltz | ..................... | G06F 3/0679 |

* cited by examiner

*Primary Examiner* — Yaima Rigol
(74) *Attorney, Agent, or Firm* — Holland & Hart LLP

(57) ABSTRACT

Methods, systems, and devices for managing address access information are described. A device may receive a command for an address of a memory array. Based on or in response to the command, the device may read a first set of tag bits from the memory array. The first set of tag bits may indicate access information for a set of addresses that includes the address. The device may determine a second set of tag bits based on the command and the address. The second set of tag bits may indicate updated access information for the address. The device may generate a codeword based on the first set of tag bits and the second set of tag bits and may store the codeword in the memory array.

25 Claims, 9 Drawing Sheets

MANAGING ADDRESS ACCESS INFORMATION

CROSS REFERENCE

The present Application for Patent claims the benefit of U.S. Patent Application No. 63/210,897 by Song et al., entitled "MANAGING ADDRESS ACCESS INFORMATION," filed Jun. 15, 2021, assigned to the assignee hereof, and expressly incorporated by reference in its entirety herein.

FIELD OF TECHNOLOGY

The following relates generally to one or more systems for memory and more specifically to managing address access information.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state if disconnected from an external power source.

DETAILED DESCRIPTION

Some devices, such as memory devices, may manage a memory by using metadata that provides information about the status of memory cells in the memory. For example, a device may use dirty bits that indicate whether an address (e.g., a column address, a row address) has been accessed (e.g., written to, read from). Dirty bits may be a subset of tag bits, which may refer to bits that provide status information for a memory. To improve the reliability of the dirty bits, a device may protect the dirty bits using an error correction code (ECC). For example, the device may encode and decode the dirty bits using an ECC engine that is also used for data bits. But the location and size (e.g., a quantity of logic gates) of the ECC engine may negatively impact the efficiency and latency of ECC operations for the dirty bits, among other disadvantages.

According to the techniques described herein, a device may improve the efficiency of ECC operations for tag bits, such as tag bits that include dirty bits, among other advantages, by using a separate ECC engine (relative to the ECC engine for the data bits) to perform ECC operations on at least some tag bits, such as the dirty bits. The size of the ECC engine for the dirty bits (which may be referred to as the tag ECC engine) may be smaller than the size of the ECC engine for the data bits (which may be referred to as the data ECC engine), which may improve the operating speed of the tag ECC engine relative to the data ECC engine. Additionally or alternatively, the tag ECC engine may be disposed near the memory array that stores the dirty bits, which may reduce, relative to other techniques or configurations, the latency associated with performing ECC operations on the dirty bits.

Features of the disclosure are initially described in the context of systems as described with reference to FIGS. 1 and 2. Features of the disclosure are described in the context a device, process flows, and timing diagrams as described with reference to FIGS. 3-7. These and other features of the disclosure are further illustrated by and described with reference to an apparatus diagram and flowcharts that relate to managing address access information as described with reference to FIGS. 8 and 9.

Figure 1:
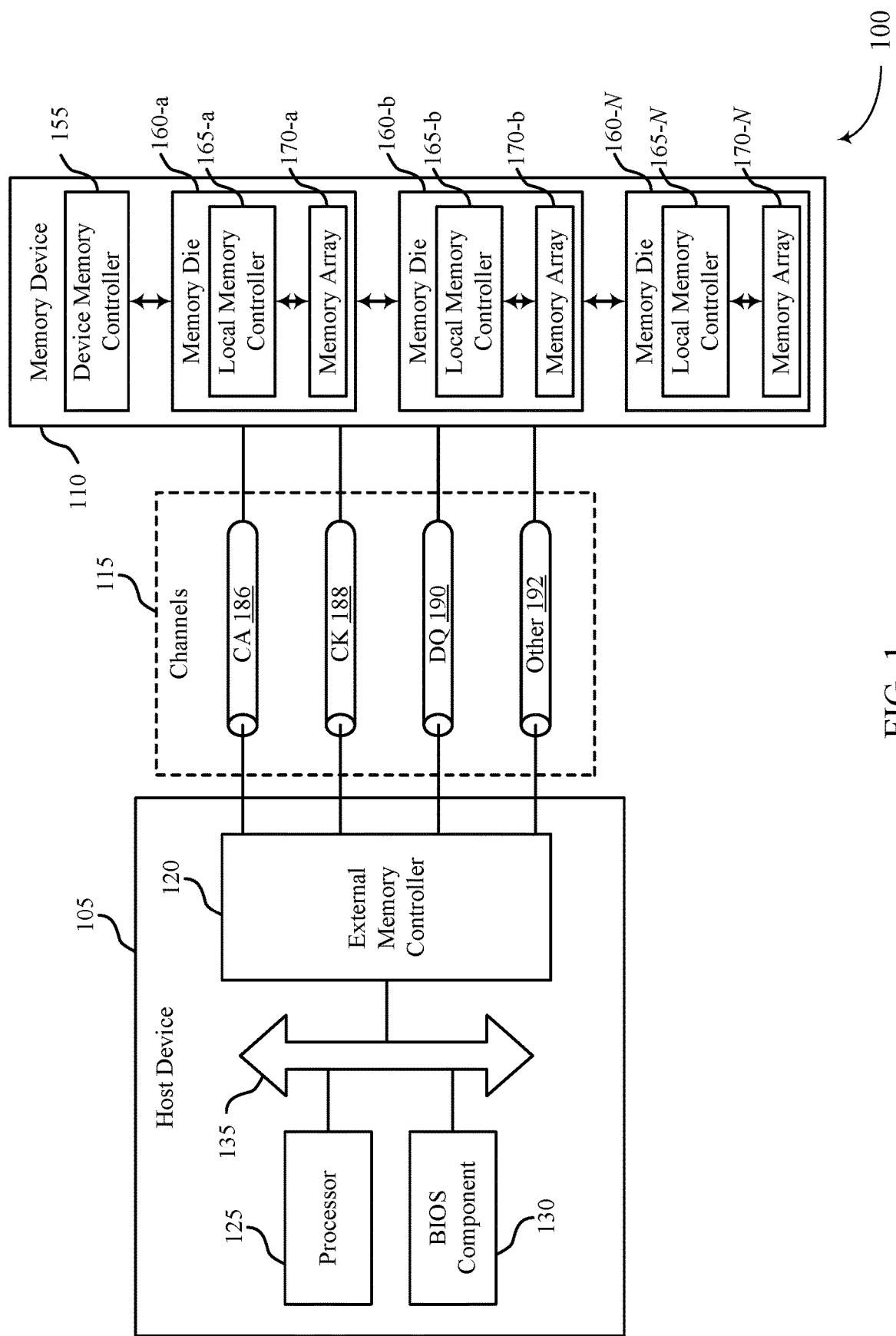
FIG. 1 illustrates an example of a system that supports managing address access information in accordance with examples as disclosed herein.

FIG. 1 illustrates an example of a system 100 that supports managing address access information in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160-$a$, memory die 160-$b$, memory die 160-N) may include a local memory controller 165 (e.g., local memory controller 165-$a$, local memory controller 165-$b$, local memory controller 165-N) and a memory array 170 (e.g., memory array 170-$a$, memory array 170-$b$, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths). In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc. In some examples, the one or more other channels 192 may include one or more error detection code (EDC) channels. The EDC channels may be operable to communicate error detection signals, such as checksums, to improve system reliability. An EDC channel may include any quantity of signal paths.

Information stored in the memory device 110 may become corrupted over time, resulting in one or more errors in the data regardless of refresh operation. To increase the reliability of the memory device 110, the memory device 110 may implement an error correction scheme to detect, identify, and correct such errors. For example, before storing a set of data bits the memory device 110 may use an error correction code to generate a codeword—made up of the data bits and corresponding parity bits—that can be used by the memory device 110 to detect errors in the codeword. The parity bits may be generated by applying the error correction code to the set of data bits, which may involve inputting the set of data bits into a logic circuit made up of, for example, a series of XOR logic gates. The memory device 110 may store the set of data bits and the parity bits (collectively referred to as a "codeword") in memory so that one or more errors in the codeword can be detected (and possibly corrected) during a read operation. For example, the memory device 110 may detect an error in the codeword based on or in response to syndrome bits that are generated (e.g., during a decoding process) from the bits of the codeword stored in memory.

In some examples, ECC techniques may be used to protect metadata bits, which may be bits that provide information about a memory array. For example, ECC techniques may be used to protect dirty bits, which may indicate the access status of columns (or rows) in a memory array. If the memory device 110 operates the memory array as a cache (e.g., for a primary memory, such as a non-volatile memory), the memory device 110 may use the dirty bits to perform evictions procedures in which data from the memory array is moved to from the cache to a primary memory. Other uses for dirty bits are also contemplated and within the scope of the present disclosure. For example, the host device 105 may determine which memory cells to access based on (e.g., as a function of) the access status for those memory cells. Dirty bits may be a subset of tag bits, which may refer to bits that provide status information for a memory array. Other subsets of tag bits may include validity bits, which may indicate the validity status of data stored at addresses, and tag address bits, which may indicate cache address information.

Rather than using a single ECC engine for data bits and dirty bits, which may be inefficient or slow, among other disadvantages, a memory device 110 may use separate ECC engines for data bits and dirty bits. For example, a memory device 110 may use a data ECC engine for data bits and a tag ECC engine for dirty bits. Relative to the data ECC engine, which may be large and far from the memory array that stores the data bits and dirty bits, the tag ECC engine may be smaller and nearer the memory array, which may improve latency and efficiency. Although described with reference to dirty bits, the techniques described herein may be applied to other types of bits, such as other types of metadata bits.

In some examples, the techniques described herein may be implemented by a multi-memory device that includes a non-volatile memory (e.g., FeRAM) and a volatile memory (DRAM). The device may operate the non-volatile memory as a primary memory for storing information and may operate the volatile memory as a cache for the non-volatile memory. Such a configuration may allow the device to benefit from advantages of the non-volatile memory (e.g., non-volatility and persistent storage, high storage capacity, low power consumption) while maintaining compatibility with a host device through the volatile memory, among other aspects. The device may manage the operations of the volatile memory using metadata, such as dirty bits. To increase the efficiency of ECC operations for the metadata, the device may implement aspects of the techniques described herein.

Although described with reference to DRAM, the techniques described herein may be implement for any type of memory and are not limited to the memory technologies described herein.

The system 100 may include any quantity of non-transitory computer readable media that support managing address access information. For example, the host device 105, the external memory controller 120, the memory device 110, or the device memory controller 155 may include or otherwise may access one or more non-transitory computer readable media storing instructions (e.g., firmware) for performing the functions ascribed herein to the host device 105, the external memory controller 120, the memory device 110, or the device memory controller 155. For example, such instructions, if executed by the host device 105 (e.g., by the processor 125), by the external memory controller 120, by the memory device 110 (e.g., by the device memory controller 155 or a local memory controller 165), may cause the host device 105, the external memory controller 120, the memory device 110, or the device memory controller 155 to perform associated functions as described herein.

Figure 2:
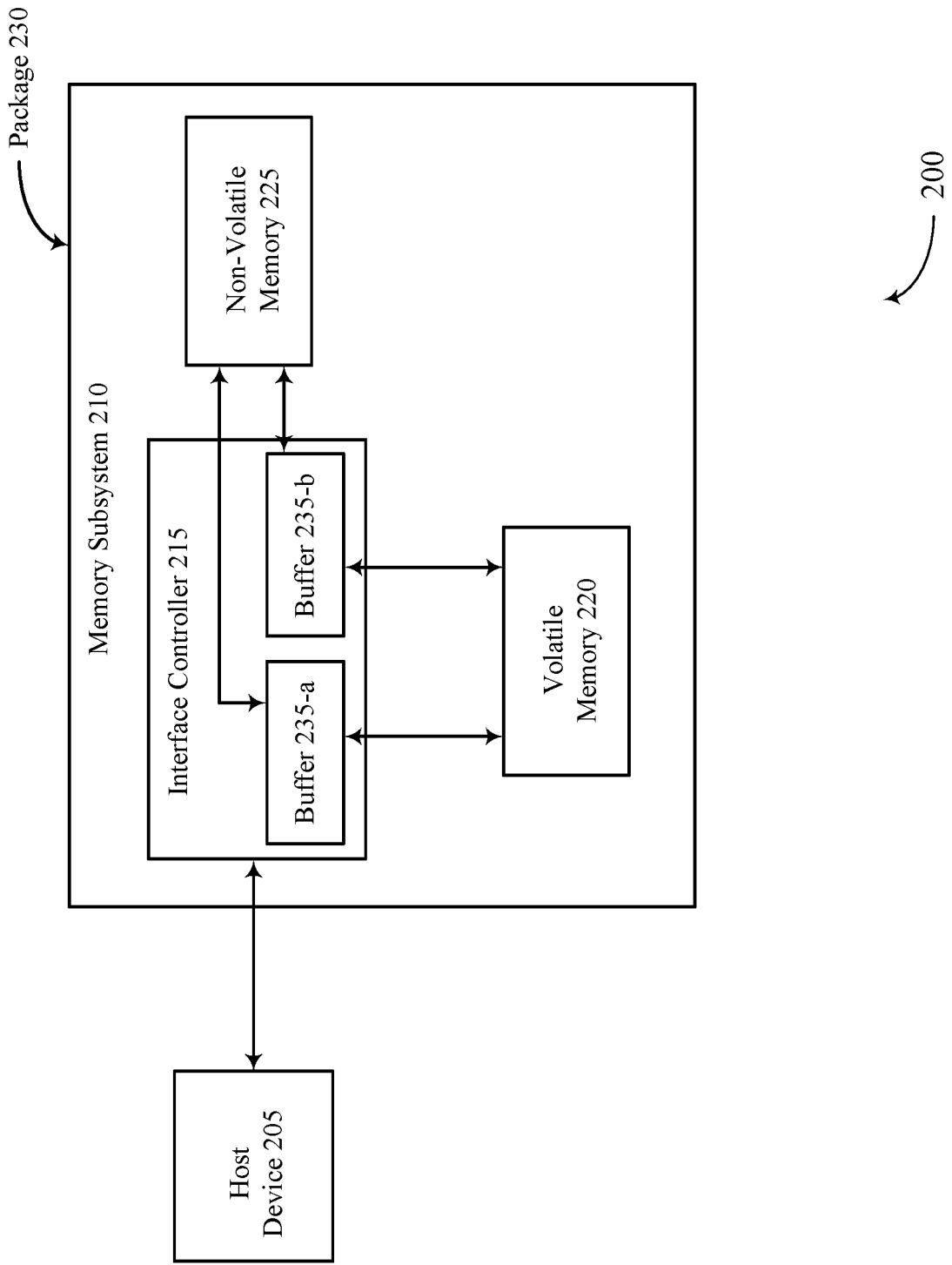
FIG. 2 illustrates an example of a system that supports managing address access information in accordance with examples as disclosed herein.

FIG. 2 illustrates an example of a system 200 that supports managing address access information in accordance with examples as disclosed herein. The system 200 may include a host device 205 and a memory subsystem 210. The host device 205 may be a processor or system-on-a-chip (SoC) that interfaces with the interface controller 215 as well as other components of the electronic device that includes the system 200. The memory subsystem 210 may store and provide access to electronic information (e.g., digital information, data) for the host device 205. The memory subsystem 210 may include an interface controller 215, a volatile memory 220, and a non-volatile memory 225. In some examples, the interface controller 215, the volatile memory 220, and the non-volatile memory 225 may be included in a same physical package such as a package 230. However, the interface controller 215, the volatile memory 220, and the non-volatile memory 225 may be disposed on different, respective dies (e.g., silicon dies).

The memory subsystem 210 may be configured to provide the benefits of the non-volatile memory 225 while maintaining compatibility with a host device 205 that supports protocols for a different type of memory, such as the volatile memory 220, among other examples. For example, the non-volatile memory 225 may provide benefits (e.g., relative to the volatile memory 220) such as non-volatility, higher capacity, or lower power consumption. But the host device 205 may be incompatible or inefficiently configured with various aspects of the non-volatile memory 225. For instance, the host device 205 may support voltages, access latencies, protocols, page sizes, etc. that are incompatible with the non-volatile memory 225. To compensate for the incompatibility between the host device 205 and the non-volatile memory 225, the memory subsystem 210 may be configured with the volatile memory 220, which may be compatible with the host device 205 and serve as a cache for the non-volatile memory 225. Thus, the host device 205 may use protocols supported by the volatile memory 220 while benefitting from the advantages of the non-volatile memory 225.

The host device 205 may be configured to interface with the memory subsystem 210 using a first protocol (e.g., low-power double data rate (LPDDR)) supported by the interface controller 215. Thus, the host device 205 may, in some examples, interface with the interface controller 215 directly and the non-volatile memory 225 and the volatile memory 220 indirectly. In alternative examples, the host device 205 may interface directly with the non-volatile memory 225 and the volatile memory 220. The host device 205 may also interface with other components of the electronic device that includes the system 200. The host device 205 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components.

The interface controller 215 may be configured to interface with the volatile memory 220 and the non-volatile memory 225 on behalf of the host device 205 (e.g., based on or in response to one or more commands or requests issued by the host device 205). For instance, the interface controller 215 may facilitate the retrieval and storage of data in the volatile memory 220 and the non-volatile memory 225 on behalf of the host device 205. Thus, the interface controller 215 may facilitate data transfer between various subcomponents, such as between at least some of the host device 205, the volatile memory 220, or the non-volatile memory 225. The interface controller 215 may interface with the host device 205 and the volatile memory 220 using the first protocol and may interface with the non-volatile memory 225 using a second protocol supported by the non-volatile memory 225.

The non-volatile memory 225 may be configured to store digital information (e.g., data) for the electronic device that includes the system 200. Accordingly, the non-volatile memory 225 may include an array or arrays of memory cells and a local memory controller configured to operate the array(s) of memory cells. In some examples, the memory cells may be or include FeRAM cells (e.g., the non-volatile memory 225 may be FeRAM). The non-volatile memory 225 may be configured to interface with the interface controller 215 using the second protocol that is different than the first protocol used between the interface controller 215 and the host device 205. In some examples, the non-volatile memory 225 may have a longer latency for access operations than the volatile memory 220. For example, retrieving data from the non-volatile memory 225 may take longer than retrieving data from the volatile memory 220. Similarly, writing data to the non-volatile memory 225 may take longer than writing data to the volatile memory 220. In some examples, the non-volatile memory 225 may have a smaller page size than the volatile memory 220, as described herein.

The volatile memory 220 may be configured to operate as a cache for one or more components, such as the non-volatile memory 225. For example, the volatile memory 220 may store information (e.g., data) for the electronic device that includes the system 200. Accordingly, the volatile memory 220 may include an array or arrays of memory cells and a local memory controller configured to operate the array(s) of memory cells. In some examples, the memory cells may be or include DRAM cells (e.g., the volatile memory may be DRAM). The non-volatile memory 225 may be configured to interface with the interface controller 215 using the first protocol that is used between the interface controller 215 and the host device 205.

In some examples, the volatile memory 220 may have a shorter latency for access operations than the non-volatile memory 225. For example, retrieving data from the volatile memory 220 may take less time than retrieving data from the non-volatile memory 225. Similarly, writing data to the volatile memory 220 may take less time than writing data to the non-volatile memory 225. In some examples, the volatile memory 220 may have a larger page size than the non-volatile memory 225. For instance, the page size of volatile memory 220 may be 2 kilobytes (2 kB) and the page size of non-volatile memory 225 may be 64 bytes (64B) or 128 bytes (128B).

Although the non-volatile memory 225 may be a higher-density memory than the volatile memory 220, accessing the non-volatile memory 225 may take longer than accessing the volatile memory 220 (e.g., due to different architectures and protocols, among other reasons). Accordingly, operating the volatile memory 220 as a cache may reduce latency in the system 200. As an example, an access request for data from the host device 205 may be satisfied relatively quickly by retrieving the data from the volatile memory 220 rather than from the non-volatile memory 225. To facilitate operation of the volatile memory 220 as a cache, the interface controller 215 may include multiple buffers 235. The buffers 235 may be disposed on the same die as the interface controller 215 and may be configured to temporarily store data for transfer between the volatile memory 220, the non-volatile memory 225, or the host device 205 (or any combination thereof) during one or more access operations (e.g., storage and retrieval operations).

To store data in the memory subsystem 210, the host device 205 may initiate a write operation by transmitting a write command (also referred to as a storage request, a storage command, or a write request) to the interface controller 215. The write command may target a set of non-volatile memory cells in the non-volatile memory 225. The host device 205 may also provide the data to be written to the set of non-volatile memory cells to the interface controller 215. The interface controller 215 may temporarily store the data in the buffer 235-*a*. After storing the data in the buffer 235-*a*, the interface controller 215 may transfer the data from the buffer 235-*a* to the volatile memory 220 or the non-volatile memory 225 or both. In write-through mode, the interface controller 215 may transfer the data to both the volatile memory 220 and the non-volatile memory 225. In write-back mode, the interface controller 215 may simply transfer the data to the volatile memory 220 (with the data being transferred to the non-volatile memory 225 during a later eviction process).

In either mode, the interface controller 215 may identify an appropriate set of one or more volatile memory cells in the volatile memory 220 for storing the data associated with the write command. To do so, the interface controller 215 may implement set-associative mapping in which each set of one or more non-volatile memory cells in the non-volatile memory 225 may be mapped to multiple sets (e.g., rows) of volatile memory cells in the volatile memory 220. For instance, the interface controller 215 may implement n-way associative mapping which allows data from a set of non-volatile memory cells to be stored in one of n sets of volatile memory cells in the volatile memory 220. Thus, the interface controller 215 may manage the volatile memory 220 as a cache for the non-volatile memory 225 by referencing the n sets of volatile memory cells associated with a targeted set of non-volatile memory cells. Although described with reference to set-associative mapping, the interface controller 215 may manage the volatile memory 220 as a cache by implementing one or more other types of mapping such as direct mapping or associative mapping, among other examples.

After determining which n sets of volatile memory cells are associated with the targeted set of non-volatile memory cells, the interface controller 215 may store the data in one or more of the n sets of volatile memory cells. This way, a subsequent (e.g., following) read command from the host device 205 for the data can be efficiently satisfied by retrieving the data from the lower-latency volatile memory 220 instead of retrieving the data from the higher-latency non-volatile memory 225. The interface controller 215 may determine which of the n sets of the volatile memory 220 store the data based on or in response to one or more parameters associated with the data stored in the n sets of the volatile memory 220, such as the validity, age, or modification status of the data. Thus, a write command by the host device 205 may be wholly (e.g., in write-back mode) or partially (e.g., in write-through mode) satisfied by storing the data in the volatile memory 220. To track the data stored in the volatile memory 220, the interface controller 215 may store for one or more sets of volatile memory cells (e.g., for each set of volatile memory cells) a tag address that indicates the non-volatile memory cells with data stored in a given set of volatile memory cells.

To retrieve data from the memory subsystem 210, the host device 205 may initiate a read operation by transmitting a read command (also referred to as a retrieval request, a retrieval command, or a read request) to the interface controller 215. The read command may target a set of one or more non-volatile memory cells in the non-volatile memory 225. Upon receiving the read command, the interface controller 215 may check for the requested data in the volatile memory 220. For instance, the interface controller 215 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 215 may transfer the data from the volatile memory 220 to the buffer 235-*a* (e.g., in response to determining whether or that one of the n sets of volatile memory cells stores the requested data, as described in FIGS. 4 and 5) so that it can be transmitted to the host device 205.

In general, the term "hit" may be used to refer to the scenario where the volatile memory 220 stores data targeted by the host device 205. If the n sets of one or more volatile memory cells do not store the requested data (e.g., the n sets of volatile memory cells store data for a set of non-volatile memory cells other than the targeted set of non-volatile memory cells), the interface controller 215 may transfer the requested data from the non-volatile memory 225 to the buffer 235-*a* (e.g., in response to determining whether or that the n sets of volatile memory cells do not store the requested data, as described with reference to FIGS. 4 and 5) so that it can be transmitted to the host device 205. In general, the term "miss" may be used to refer to the scenario where the volatile memory 220 does not store data targeted by the host device 205.

In a miss scenario, after transferring the requested data to the buffer 235-*a*, the interface controller 215 may transfer the requested data from the buffer 235-*a* to the volatile memory 220 so that subsequent read requests for the data can be satisfied by the volatile memory 220 instead of the non-volatile memory 225. For example, the interface controller 215 may store the data in one of then sets of volatile memory cells associated with the targeted set of non-volatile memory cells. But then sets of volatile memory cells may already be storing data for other sets of non-volatile memory cells. So, to preserve this other data, the interface controller 215 may transfer the other data to the buffer 235-*b* so that it can be transferred to the non-volatile memory 225 for storage. Such a process may be referred to as "eviction" and the data transferred from the volatile memory 220 to the buffer 235-*b* may be referred to as "victim" data.

In some cases, the interface controller 215 may transfer a subset of the victim data from the buffer 235-*b* to the non-volatile memory 225. For example, the interface controller 215 may transfer one or more subsets of victim data that have changed since the data was initially stored in the non-volatile memory 225. Data that is inconsistent between the volatile memory 220 and the non-volatile memory 225 (e.g., due to an update in one memory and not the other) may be referred to in some cases as "modified" or "dirty" data. In some examples (e.g., if interface controller operates in one mode such as a write-back mode), dirty data may be data that is present in the volatile memory 220 but not present in the non-volatile memory 225.

So, the interface controller 215 may perform an eviction procedure to save data from the volatile memory 220 to the non-volatile memory 225 if the volatile memory 220 is full (e.g., to make space for new data in the volatile memory 220). In some examples, the interface controller 215 may perform a "fill" procedure in which data from the non-volatile memory 225 is saved to the volatile memory 220. The interface controller 215 may perform a fill procedure in the event of a miss (e.g., to populate the volatile memory 220 with relevant data). For example, in the event of a read miss, which occurs if a read command from the host device 205 targets data stored in the non-volatile memory 225 instead of the volatile memory 220, the interface controller 215 may retrieve (from the non-volatile memory 225) the data requested by the read command and, in addition to returning the data to the host device, store the data in the volatile memory 220 (e.g., so that the data can be retrieved quickly in the future).

Thus, the memory subsystem 210 may satisfy (or "fulfill") requests (e.g., read commands, write commands) from the host device 205 using either the volatile memory 220 or the non-volatile memory 225, depending on the hit or miss status of the request. For example, in the event of a read miss, the read command from the host device 205 may be satisfied by the non-volatile memory 225, which means that the data returned from the host device 205 may originate from the non-volatile memory 225. And in the event of a read hit, the read command from the host device 205 may be satisfied by the volatile memory 220, which means that the data returned from the host device 205 may originate from the volatile memory 220. In some examples, the ratio of hits to misses ("hit-to-miss ratio") may be relatively high (e.g., the hit percentage (or "hit rate") may be around 85% whereas the miss percentage (or "miss rate") may be around 15%).

The memory subsystem 210 may implement the techniques described herein to manage tag bits for the volatile memory 220, the non-volatile memory 225, or both. For example, the memory subsystem 210 may use a data ECC engine to perform ECC operations on data bits and may use a tag ECC engine to perform ECC operations on tag bits.

Figure 3:
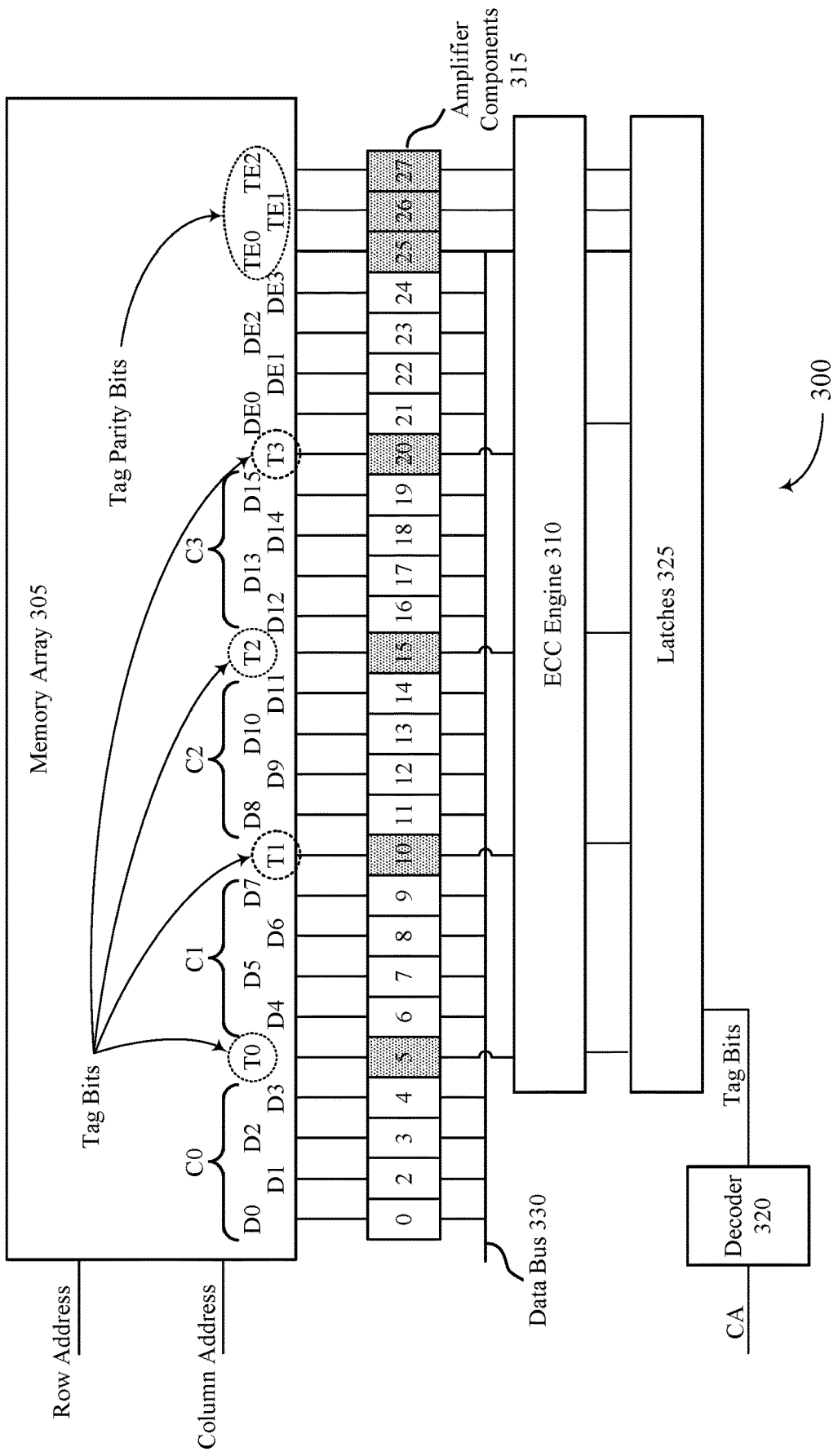
FIG. 3 illustrates an example of a device that supports managing address access information in accordance with examples as disclosed herein.

FIG. 3 illustrates an example of a device 300 that supports managing address access information in accordance with examples as disclosed herein. The device 300 may be an example of a system 100 or a memory device 110 as described with reference to FIG. 1 or the device 300 may be an example of a system 200 or a memory subsystem 210 as described with reference to FIG. 2. The device 300 may include a memory array 305 and an ECC engine 310, which may be an example of a tag ECC engine. The device 300 may use the ECC engine 310 to update tag bits, such as dirty bits, in the memory array 305.

The memory array 305 may include memory cells arranged in columns and rows, where the memory cells in a row are in different columns. For example, the memory array 305 may include memory cells that store data bits, parity bits, and tag bits, such as dirty bits. As an illustration, the memory array may include memory cells that store data bits D0 through D13, memory cells that store parity bits for the data bits (denoted DE0 through DE4), memory cells that store dirty bits T0 through T3, and memory cells that store parity bits for the tag bits (denoted TE0 through TE2). The memory array 305 may include four columns (C0 through C3) that each include four memory cells. For example, column C0 may include the memory cells that store D0 through D3, column C1 may include the memory cells that store D4 through D7, column C2 may include the memory cells that store D8 through D11, and column C3 may include the memory cells D12 through D15. The memory cells in a column may be in one rows. Further, the memory array 305 may have many rows associated with the columns. Thus, in one example, the memory array 305 may include memory cells in one row and four columns.

The configuration of the memory array 305 is for illustrative purposes and is not limiting. Other configurations of the memory array 305 are contemplated and within the scope of the present disclosure.

A memory cell may be differentiated from other memory cells by its column address and row address. Thus, each memory cell may be accessed based on (e.g., according to, using) the corresponding address for that memory cell. The device 300 may keep track of which addresses have been accessed (e.g., written to, read from) by maintaining a set of dirty bits. For example, the device 300 may store dirty bits T0 through T3 in the memory array, where T0 is the dirty bit for column C0, T1 is the dirty bit for column C1, T2 is the dirty bit for column C2, and T3 is the dirty bit for column C3. A first value of a dirty bit (e.g., a logic 0) may indicate that the corresponding column has not been accessed, whereas a second value of the dirty bit (e.g., a logic 1) may indicate that the corresponding column has been accessed. Although described with reference to columns, the techniques described herein may additionally or alternatively be implemented for rows of the memory array 305.

The device 300 may access the memory array 305 using the amplifier components 315, which may be input/output (I/O) amplifiers or other circuitry capable of reading and writing the memory cells of the memory array 305. The amplifier components 315 may be coupled with the memory cells of the memory array 305 via one or more traces (which may also be referred to as conductive lines), such as local data lines. The device 300 may determine which memory cells to access based on (e.g., in accordance with) column addresses and row addresses. Data bits from (or for) the memory array 305 may be communicated over the data bus 330, which may be a bi-directional data bus.

The device 300 may include on or more decoders that decode address information for the memory array 305. For example, the device 300 may include decoder 320, which may decode address information (e.g., column addresses) from the host device and generate tag bits corresponding to the decoded column addresses. For example, if the decoder 320 receives address information for column C0 (which may be indicated by a command from a host device), the decoder 320 may generate a tag bit that is set to a logic 1 for column C0. The tag bits generated by the decoder 320 may be referred to as generated tag bits and the tag bits stored by the memory array 305 may be referred to as stored tag bits.

If the device 300 receives a memory operation command for accessing one of the columns in memory array 305, the device 300 may update the stored tag bits in the memory array 305. To update the stored tag bits in the memory array 305, the device 300 may read the stored tag bits using the amplifier components 315 and communicate the stored tag bits to the ECC engine 310. For example, the device 300 may read the stored tag bits T0 through T3 using corresponding amplifier components 315 (e.g., amplifier components 5, 10, 15, and 20), which may communicate the stored tag bits T0 through T3 to the ECC engine 310. In some examples (e.g., if the device 300 is in an error correction mode), the device 300 may also read the parity bits TE0 through TE2 using the amplifier components 315 (e.g., using amplifier components 25, 26, and 27) and communicate the parity bits TE0 through TE2 to the ECC engine 310.

Continuing the forgoing example, the device 300 may communicate generated tag bits from the decoder 320 to the latches 325. The generated tag bits may be based on (e.g., correspond to) the column address(es) indicated by the memory operation command. The latches 325 may be components capable of latching (e.g., preserving) information bits such as generated tag bits and updated tag bits. The latches 325 may communicate the generated tag bits received from the decoder 320 to the ECC engine 310 for combination with the stored tag bits.

Thus, the ECC engine 310 may receive and combine the stored tag bits and the generated tag bits. Combining the stored tag bits and the generated tag bits (rather than just storing the generated tag bits) may allow the device 300 to keep the stored tag bits ECC-protected (because overwriting the stored tag bits with generated tag bits could disrupt the ECC protection of the associated parity bits). Combining the stored tag bits and the generated tag bits (rather than generating a new codeword based solely on the generated tag bits) may allow the device to preserve the stored tag bits that are not updated by the generated tag bits.

Although described with reference to the ECC engine 310, other components of the device 300 may combine the stored tag bits with the generated tag bits. For example, a set of multiplexers coupled with the ECC engine 310 and the latches 325 may combine the stored tag bits with the generated tag bits. In some examples combining the stored tag bits with the generated tag bits may involve one or more logic OR operations. Thus, combining the stored tag bits and the generated tag bits may result in a same quantity of tag bits as the stored tag bits but different values for at least some of the stored tag bits. The quantity of stored tag bits and the quantity of generated tag bits may be the same or different.

The ECC engine 310 may optionally perform an ECC decoding operation on the stored tag bits before combining the stored tag bits with the generated tag bits. For example, the ECC engine 310 may decode the codeword made up of the stored tag bits and the parity bits TE0 through TE2 to generate a set of syndrome bits for the codeword. The ECC engine 310 may then use the syndrome bits to detect and correct any errors within the codeword. Thus, the reliability of the stored tag bits may be improved by performing ECC decoding, error detection, and error correction.

The mode of the device 300 may determine (e.g., control) whether the ECC engine 310 performs ECC decoding on a codeword before combining the stored tag bits with the generated tag bits. For example, the ECC engine 310 may not perform ECC decoding if the device 300 is in a low power mode or a low latency mode. As another example, the ECC engine 310 may perform ECC decoding if the device 300 is in a high power mode or a latency-tolerant mode.

After combining the stored tag bits with the generated tag bits, the ECC engine 310 may perform an ECC encoding operation on the combined tag bits. For example, the ECC engine may apply an ECC code (e.g., a Hamming matrix) to the combined tag bits to generate a set of parity bits for the combined tag bits. Collectively, the combined tag bits and the parity bits for the combined tag bits may form a codeword that represents the updated tag information for the memory array 305. After generating the new codeword for the tag information, the ECC engine 310 may communicate the codeword to the latches 325 for preservation. The latches 325 may latch (e.g., store) the codeword until the device 300 is prompted to write the codeword to the memory array 305. If the device 300 is prompted to write the codeword to the memory array 305, the codeword may be communicated from the latches 325 to the amplifier components 315, which may write the codeword to the memory array. For example, the amplifier components 315 may write the tag bits of the codeword to the memory cells that store tag bits T0 through T3 and may write the parity bits of the codeword to the memory cells that store the parity bits TE0 through TE2.

Thus, the device 300 may efficiently manage access information, such as tag information, for the memory array 305.

Figure 4:
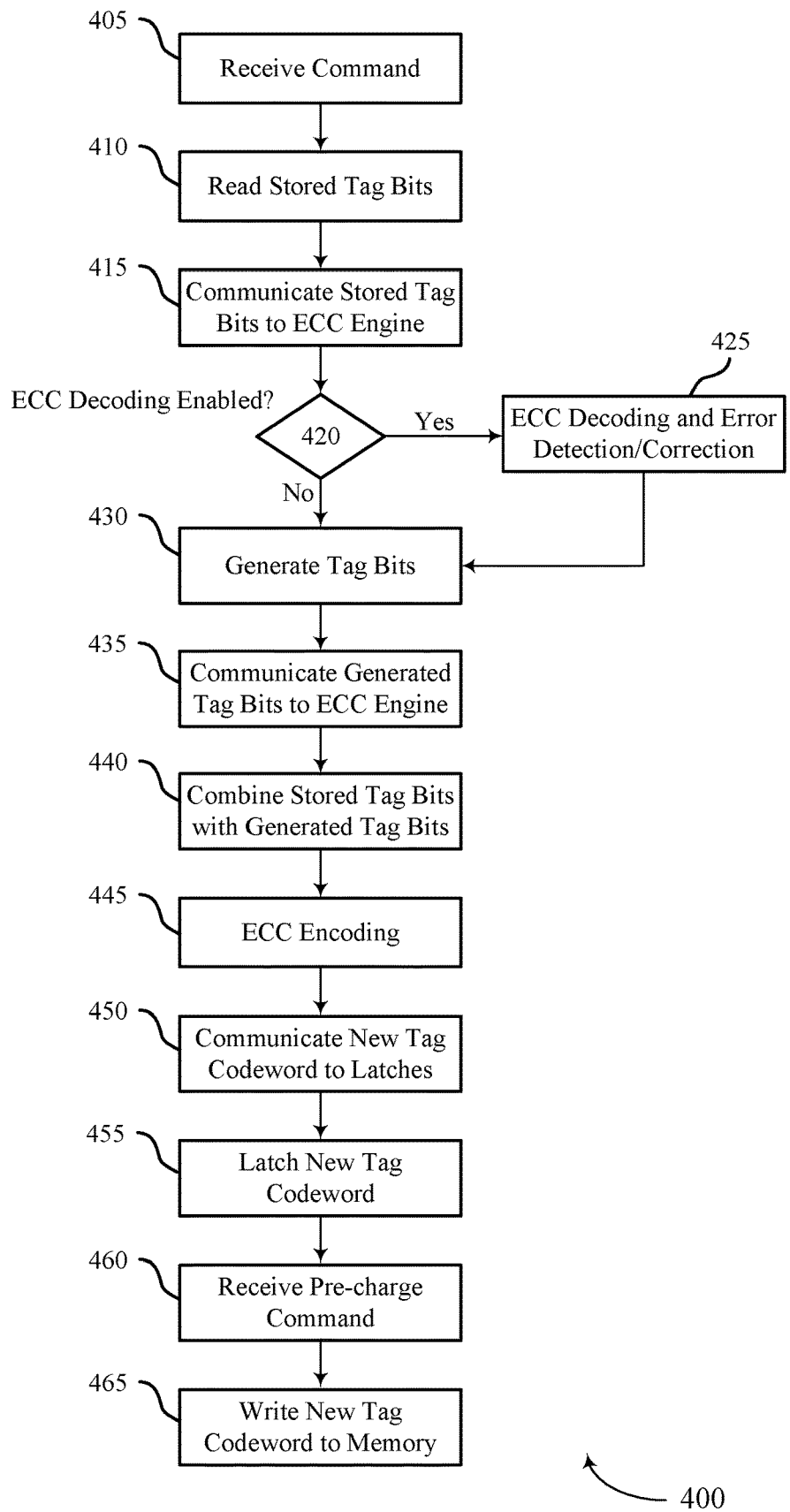
FIG. 4 illustrates an example of a process flow that supports managing address access information in accordance with examples as disclosed herein.

FIG. 4 illustrates an example of a process flow 400 that supports managing address access information in accordance with examples as disclosed herein. The process flow 400 may be implemented by a system 100, a memory device 110, a system 200, a memory subsystem 210, or a device 300 as described with reference to FIGS. 1 through 3. However, other types of devices or components may implement process flow 400. The process flow 400 may illustrate the operations of a device that uses a tag ECC engine to manage tag bits (e.g., dirty bits) for a memory array. In some examples, the process flow 400 may be an example of a read-modify-write procedure.

For ease of reference, the process flow 400 is described with reference to a device. For example, aspects of the process flow 400 may be implemented by a device that includes a volatile memory, a non-volatile memory, or both, among other configurations. Additionally or alternatively, aspects of the process flow 400 may be implemented as instructions stored in memory (e.g., firmware stored in the device). For example, the instructions, if executed by a controller, may cause the controller to perform the operations of the process flow 400.

At 405, a command, such as a memory operation command, may be received. For example, the device 300 may receive a memory operation command from a host device. The memory operation command may indicate an address (e.g., a column address, a row address) of the array 305. A memory operation command may also be referred to as an access command. Examples of memory operation commands include read commands and write commands.

At 410, stored tag bits may be read. For example, the device 300 may read stored tag bits from the memory array 305 using the amplifier components 315. The tag bits may indicate access information for one or more addresses of the memory array 305. The device 300 may read the stored tag bits based on or in response to the memory operation command received at 405. For example, the device 300 may read the stored tag bits for the column(s), row(s), or both indicated by the memory operation command. In some examples (e.g., if ECC decoding is enabled for tag bits), the device 300 may also read the parity bits for the stored tag bits.

At 415, the stored tag bits may be communicated (e.g., transferred). For example, the device 300 may communicate the stored tag bits from the amplifier components 315 to the ECC engine 310. In some examples (e.g., if ECC decoding is enabled for tag bits), the device 300 may also communicate the parity bits for the stored tag bits to the ECC engine 310.

At 420, it may be determined whether ECC decoding is enabled for tag bits. In some examples, the determination at 420 may occur before 410. The device 300 may determine whether ECC decoding is enabled for tag bits based on (e.g., in response to) a mode of the device 300. If, at 420, the device 300 determines that ECC decoding is enabled for tag bits, the device 300 may proceed to 425 and perform ECC decoding on a codeword that is made up of the stored tag bits and the parity bits for the stored tag bits. The device 300 may also detect and correct any errors in the codeword. If, at 420, the device 300 determines that ECC decoding is disabled for tag bits, the device may proceed to 430.

At 430, one or more tag bits may be generated. For example, the device 300 may (e.g., via the decoder 320) generate one or more tag bits based on (e.g., corresponding) the address(es) indicated by the memory operation command. The generated tag bits may indicate updated access information for one or more memory addresses of the memory array 305. In some examples, generating the tag bit(s) may include selecting value(s) for the tag bit(s). For example, the decoder 320 may select values for the tag bits associated with the columns (or rows) indicated by the command received at 405. To illustrate, if the command indicates column C2, the decoder 320 may select the value of tag bit T2 to be a logic 1.

At 435, the generated tag bit(s) may be communicated. For example, the device 300 may communicate the generated tag bit(s) from the decoder 320 to the latches 325, then from the latches 325 to the ECC engine 310.

At 440, the stored tag bits and the generated tag bit(s) may be combined. For example, the ECC engine 310 may combine the stored tag bits and the generated tag bit(s). In some examples, combining the stored tag bits and the generated tag bit(s) may involve using the generated tag bits to modify the stored tag bits.

At 445, ECC encoding may be performed. For example, the device 300 may perform ECC encoding on the combined tag bits to generate a codeword that is made up of the combined tag bits and parity bits for the combined tag bits. The combined tag bits may also be referred to as updated tag bits or other suitable terminology and the generated codeword may be referred to as a new tag codeword.

At 450, the new tag codeword may be communicated. For example, the device 300 may communicate the new tag codeword from the ECC engine 310 to the latches 325. At 455, the latches 325 may latch the new tag codeword. At 460, a command, such as a pre-charge command, may be received. For example, the device 300 may receive a pre-charge command from the host device. The pre-charge command may indicate that the device 300 is to close (e.g., deactivate) the row that was activated for the memory operation command.

At 465, the new tag codeword may be stored in memory. For example, the device 300 may communicate the new tag codeword from the latches 325 to the amplifier components 315, which may write the new tag codeword to the memory array 305. The device may store the new tag codeword in memory based on (e.g., in response to) the pre-charge command received at 360.

Thus, ECC-protected tag information for the memory array 305 may be updated. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 5:
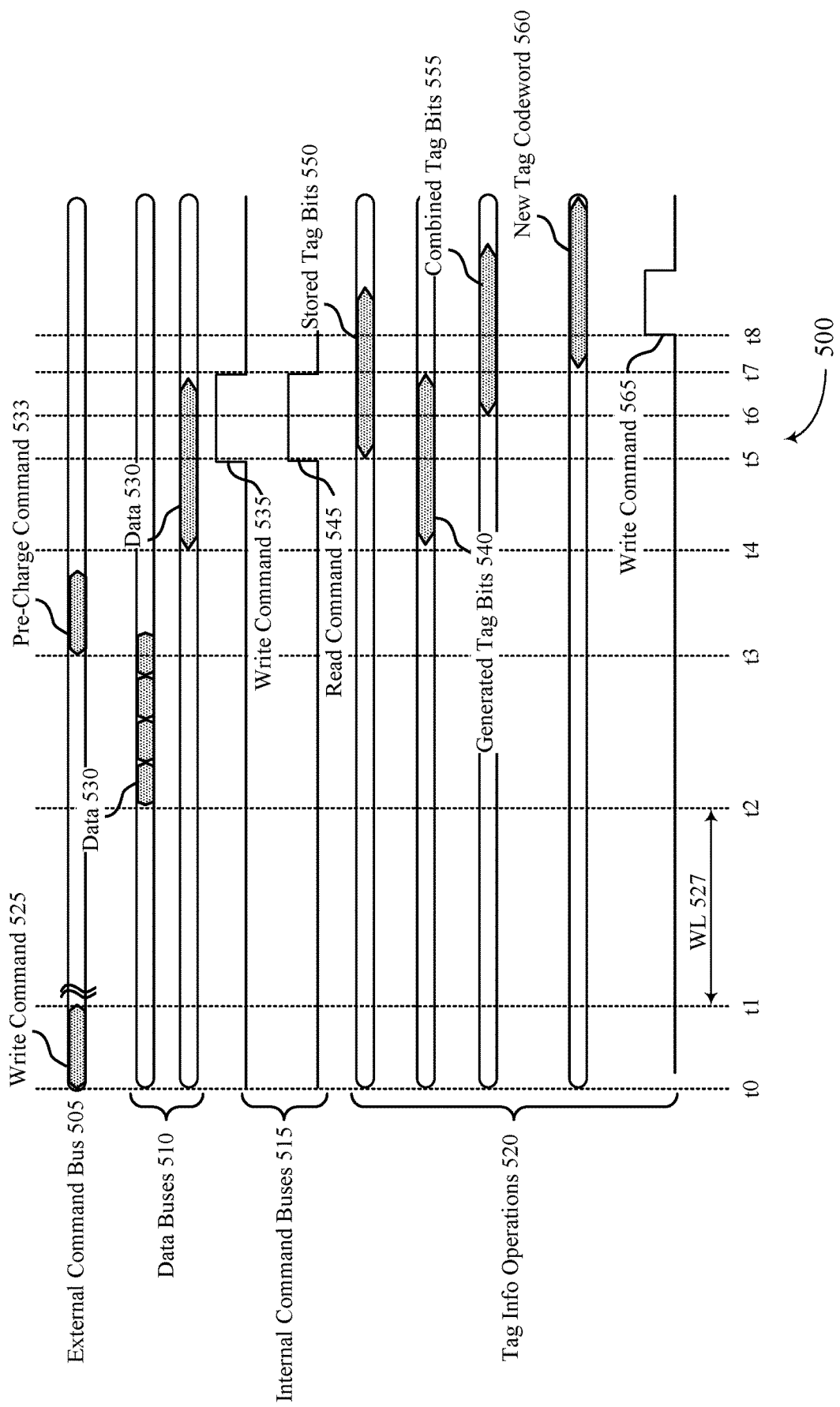
FIG. 5 illustrates an example of a timing diagram that supports managing address access information in accordance with examples as disclosed herein.

FIG. 5 illustrates an example of a timing diagram 500 that supports managing address access information in accordance with examples as disclosed herein. The timing diagram 500 may illustrate commands that are received (e.g., from a host device) over a command bus 505, data that is communicated over data buses 510, and commands that are communicated over internal command buses 515. The timing diagram may also illustrate tag information operations 520, which may refer to operations that involve tag bits such as stored tag bits and generated tag bits.

At time t0, a command, such as write command 525, may be received over the external command bus 505. The write command 525 may be received by the device 300. The write command may be for a set of data (e.g., data 530) and may indicate or be associated with a memory address (e.g., an address for the memory array 305). At time t2, after write latency 527 has expired, the set of data (e.g., data 530) may be received over one of the data buses 510.

At time t3, a command, such as a pre-charge command 533, may be received over the external command bus 505. The pre-charge command 533 may be received by the device 300. At t4, the set of data (e.g., data 530) may be internally communicated to the amplifier components 315 for writing to the memory array 305. Also at or around time t4, tag bits 540 may be generated. For example, the decoder 320 may generate tag bits 540 based on (e.g., in response to, as a function of) the write command 525 and the address indicated by the write command 525. In some examples, the tag bits 540 are generated based on (e.g., in response to) a column address which is given by the write command 525. The tag bits 540 may be communicate to the ECC engine 310 for combining.

At time t5, a write command 535 for the set of data (e.g., data 530) may be internally communicated. The write command 535 may cause the set of data to be written to the memory array 305 (e.g., at the memory address indicated by the write command 525). Also at or around time t4, a read command 545 may be internally communicated. The read command 545 may be for stored tag bits (e.g., stored tag bits 550) that are associated with the address indicated by the write command 525. The read command 545 may cause the stored tag bits 550 (and optionally the parity bits for the stored tag bits) to be read from the memory array 305. The stored tag bits 550 may be communicated to the ECC engine 310 for combining.

At time t6, the generated tag bits 540 and the stored tag bits 550 may be combined. For example, the ECC engine 310 may combine the generated tag bits 540 and the stored tag bits 550 to generate combined tag bits 555. At time t7, a new tag codeword 560 may be generated based on (e.g., using) the combined tag bits 555. At time t8, a write command 565 for the new tag codeword 560 may be internally communicated. The write command 565 may cause the new tag codeword 560 to be written to the memory array 305. In some examples, the write command 565 is based on (e.g., in response to) the pre-charge command 533.

Thus, ECC-protected tag information may be updated. Although described with reference to tag bits the operations of timing diagram 500 may be implemented for other types of bits, including dirty bits. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle. For example, at least some of the operations depicted in FIG. 5 may be performed for additional write commands that are received before the pre-charge command 533. In such a scenario, the final tag information for the memory array 305 may be processed if the pre-charge command 533 is issued.

Figure 6:
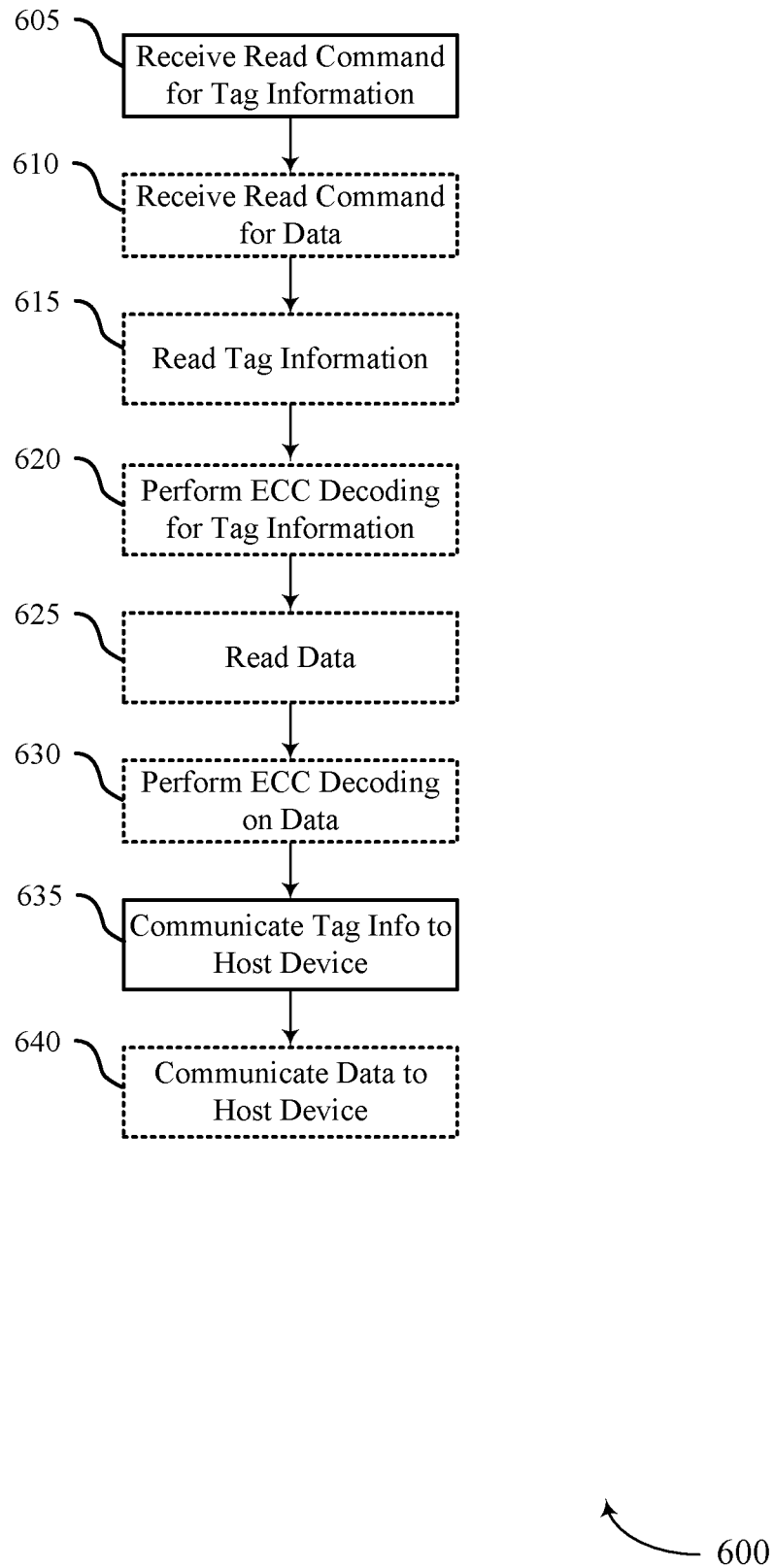
FIG. 6 illustrates an example of a process flow that supports managing address access information in accordance with examples as disclosed herein.

FIG. 6 illustrates an example of a process flow 600 that supports managing address access information in accordance with examples as disclosed herein. The process flow 600 may be implemented by a system 100, a memory device 110, a system 200, a memory subsystem 210, or a device 300 as described with reference to FIGS. 1 through 3. However, other types of devices or components may implement process flow 600. The process flow 600 may illustrate the operations of a device that uses a tag ECC engine to manage tag bits (e.g., dirty bits) for a memory array. In some examples, the process flow 600 may be an example of a read procedure for the tag bits.

For ease of reference, the process flow 600 is described with reference to a device. For example, aspects of the process flow 600 may be implemented by a device that includes a volatile memory, a non-volatile memory, or both, among other configurations. Additionally or alternatively, aspects of the process flow 600 may be implemented as instructions stored in memory (e.g., firmware stored in the device). For example, the instructions, if executed by a controller, may cause the controller to perform the operations of the process flow 600.

At 605, a command, such as a read command, may be received. For example, the device 300 may receive a read command for tag information from a host device. At 610, a command, such as a read command, may be received. For example, the device 300 may receive a read command for data. At 615, a tag codeword may be read. For example, the device 300 may read tag information from the memory array 305 based on (e.g., in response to) the read command received at 605. The device 300 may read stored tag bits, parity bits for the stored tag bits, or both. At 620, ECC decoding may be performed for the tag information. For example, the device 300 may perform ECC decoding on the tag codeword made up of the tag bits and the parity bits for the tag bits. The device 300 may also detect and correct any errors in the tag codeword. At 625, the data may be read. For example, the device 300 may read the data from the memory array 305. The device 300 may read the data based on (e.g., in response to) the read command received at 615. At 630, ECC decoding may be performed for the data. For example, the device 300 may perform ECC decoding on the data and parity bits for the data. The device 300 may also detect and correct any errors in the data codeword.

At 635, the tag information may be communicated to the host device. For example, the device 300 may communicate the tag codeword, or a portion of the tag codeword (e.g., the tag bits) to the host device. The device 300 may communicate the tag information based on (e.g., in response to) the read command received at 605. The device 300 may communicate the tag information over one or more pin of a data bus. At 640, the data may be communicated to the host device. For example, the device 300 may communicate the data to the host device. The device 300 may communicate the data based on (e.g., in response to) the read command received at 610. The device 300 may communicate the data over the data bus or a different data but. In some examples, the device 300 may communicate the tag information and the data concurrently (e.g., at partially or wholly overlapping times).

Although described with reference to tag bits the operations of the process flow 600 may be implemented for other types of bits, including dirty bits. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 7:
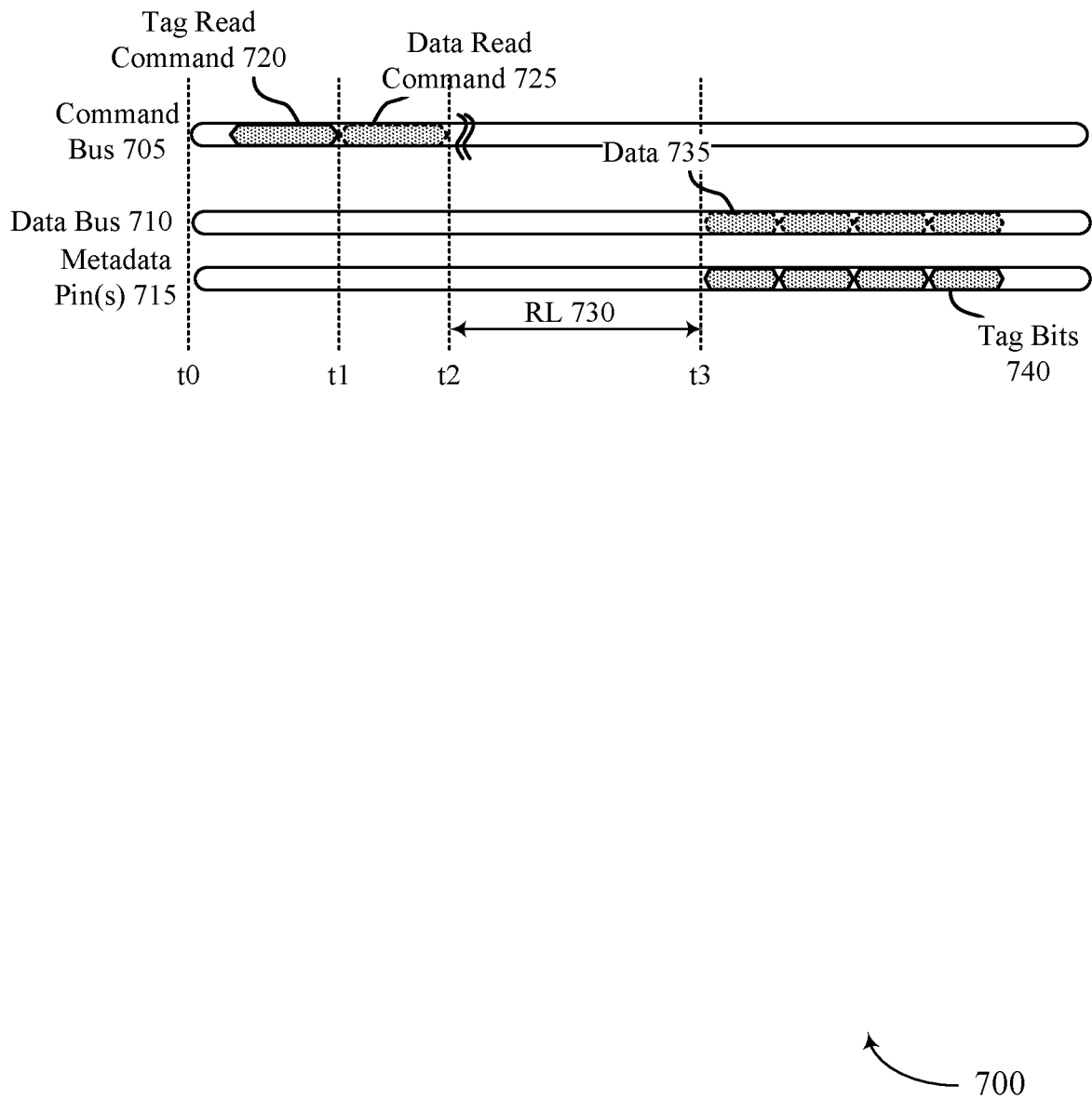
FIG. 7 illustrates an example of a timing diagram that supports managing address access information in accordance with examples as disclosed herein.

FIG. 7 illustrates an example of a timing diagram 700 that supports managing address access information in accordance with examples as disclosed herein. The timing diagram 700 may illustrate commands that are received (e.g., from a host device) over a command bus 705, data that is communicated over a data buses 710, and tag information that is communicated over one or more metadata pins 715. In some examples, the metadata pin 715 is a data masking (DM) pin. The metadata pin 715 may be included in the data bus 710 or a different data bus.

At time t0, a command, such as a tag read command 720, may be received over the command bus 705. The tag read command 720 may be received by the device 300. The tag read command 720 may be for tag information stored in the memory array 305 and may indicate or be associated with a memory address (e.g., an address for the memory array 305).

At time t1, a command, such as a data read command 725, may be received over the command bus 705. The data read command7 may be received by the device 300. The data read command 725 may be for a set of data and may indicate or be associated with a memory address. In some examples, the tag read command 720 and the data read command 725 may be combined into a single command.

At time t3, after read latency (RL) 730 (which may be relative to time t2) has expired, at least a portion of the tag information (e.g., tag bits 740) may be communicated over the metadata pin 715. The tag bits 740 may be communicated based on (e.g., in response to) the tag read command 720. Also at or around time t3, the set of data (e.g., data 735) may be received over the data bus 710. The set of data 735 may be communicated based on (e.g., in response to) the data read command 725. Thus, the tag bits 740 and the set of data 735 may be communicated in parallel (e.g., at partially over wholly overlapping times).

Although described with reference to tag bits the operations of timing diagram 700 may be implemented for other types of bits, including dirty bits. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 8:
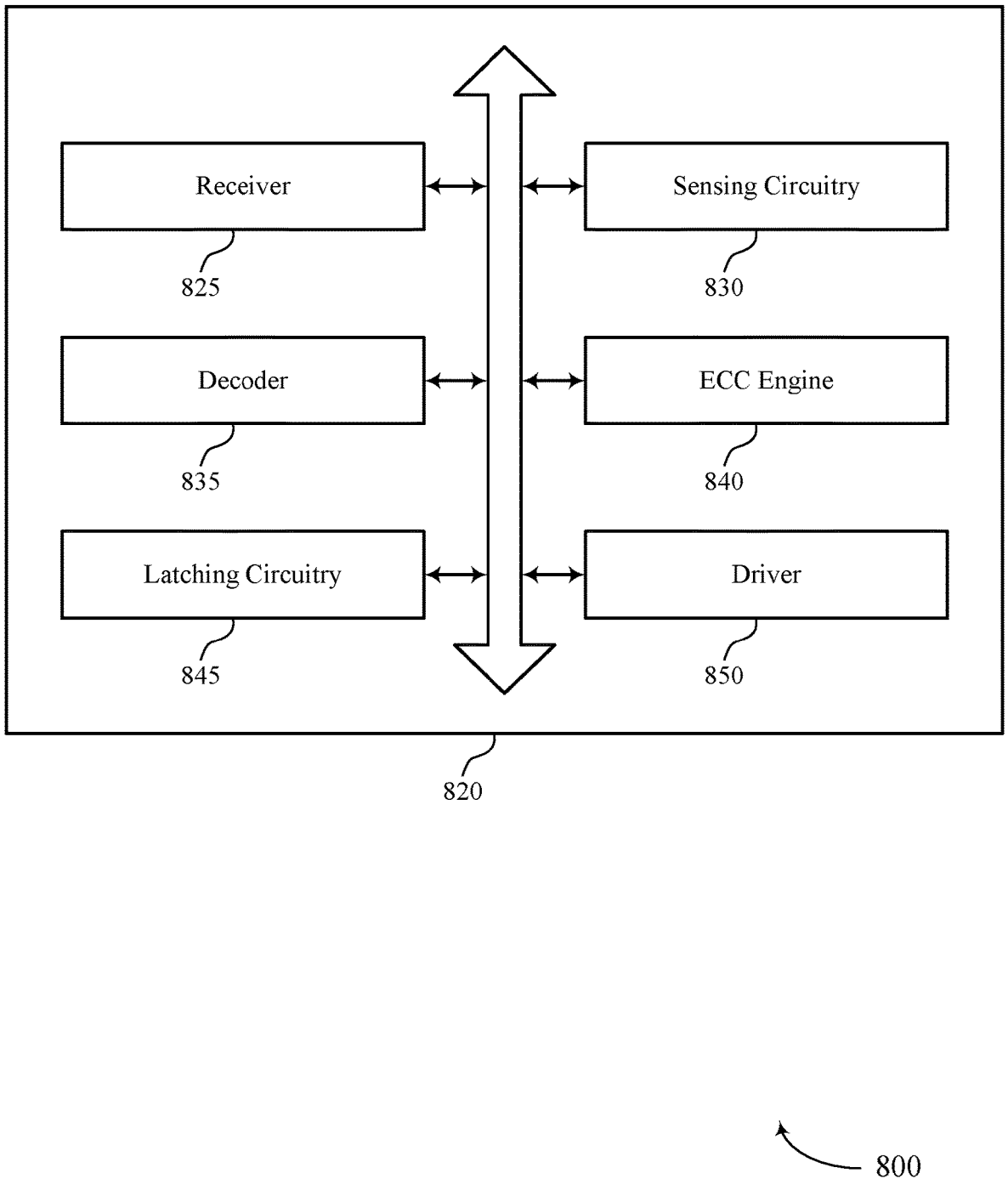
FIG. 8 shows a block diagram of a device that supports managing address access information in accordance with examples as disclosed herein.

FIG. 8 shows a block diagram 800 of a device 820 that supports managing address access information in accordance with examples as disclosed herein. The device 820 may be an example of aspects of a system, subsystem, or device as described with reference to FIGS. 1 through 7. The device 820, or various components thereof, may be an example of means for performing various aspects of managing address access information as described herein. For example, the device 820 may include a receiver 825, a sensing circuitry 830, a decoder 835, an ECC engine 840, a latching circuitry 845, a driver 850, or any combination thereof. Each of these components may communicate, directly or indirectly, with one another (e.g., via one or more buses).

The receiver 825 may be or include a data bus, a data bus interface, a buffer, logic, circuitry, a processor, a controller, or other components capable of performing the functions described herein. The sensing circuitry 830 may be or include amplifier components (e.g., amplifiers such as sense amplifiers), sense components, I/O circuitry, or other components capable of performing the functions described herein. The decoder 835 may be or include a logic circuit, a processor, a controller, or other components capable of performing the functions described herein. The ECC engine 840 may be or include a logic circuit, a processor, a controller, or other components capable of performing the functions described herein. The latching circuitry 845 may be or include latches, logic circuits, or other components capable of performing the functions described herein. The driver 850 may be or include a transmitter, a voltage generator, or other components capable of performing the functions described herein.

The receiver 825 may be configured as or otherwise support a means for receiving a command for an address of a memory array. The sensing circuitry 830 may be configured as or otherwise support a means for reading, from the memory array based at least in part on the command, a first set of tag bits indicating access information for a set of addresses that includes the address. The decoder 835 may be configured as or otherwise support a means for determining a second set of tag bits based at least in part on the command and the address, the second set of tag bits indicating updated access information for the address. The ECC engine 840 may be configured as or otherwise support a means for generating a codeword based at least in part on the first set of tag bits and the second set of tag bits. In some examples, the sensing circuitry 830 may be configured as or otherwise support a means for storing the codeword in the memory array.

In some examples, the ECC engine 840 may be configured as or otherwise support a means for combining, before generating the codeword, the first set of tag bits with the second set of tag bits to update the first set of tag bits.

In some examples, to support generating the codeword, among other operations, the ECC engine 840 may be configured as or otherwise support a means for performing ECC encoding on the updated first set of tag bits, where the codeword includes the updated first set of tag bits and a set of parity bits based at least in part on updated first set of tag bits.

In some examples, to support determining the second set of tag bits, among other operations, the decoder 835 may be configured as or otherwise support a means for selecting a value for a tag bit corresponding to the address based at least in part on the command, where the second set of tag bits includes the tag bit. In some examples, the receiver 825 may be configured as or otherwise support a means for receiving a pre-charge command after the write command, where the codeword is stored in the memory array based at least in part on receiving the pre-charge command. In some examples, the latching circuitry 845 may be configured as or otherwise support a means for latching the codeword in a set of latching components before storing the codeword in the memory array.

In some examples, the latching circuitry 845 may be configured as or otherwise support a means for communicating the codeword from the set of latching components to a set of amplifier components coupled with the memory array. In some examples, the sensing circuitry 830 may be configured as or otherwise support a means for using the set of amplifier components to store the codeword in the memory array based at least in part on communicating the codeword.

In some examples, the ECC engine 840 may be configured as or otherwise support a means for performing ECC decoding on the first set of tag bits and a set of parity bits for the first set of tag bits, where the codeword is generated based at least in part on performing the ECC decoding. In some examples, writing the codeword to the set of memory cells.

In some examples, the sensing circuitry 830 may be configured as or otherwise support a means for communicating the first set of tag bits to an ECC engine. In some examples, the latching circuitry 845 may be configured as or otherwise support a means for communicating the second set of tag bits to the ECC engine. In some examples, the ECC engine 840 may be configured as or otherwise support a means for combining the first set of tag bits with the second set of tag bits based at least in part on communicating the first and second sets of tag bits to the ECC engine.

In some examples, the receiver 825 may be configured as or otherwise support a means for receiving, from a host device, a read command for the codeword. In some examples, the driver 850 may be configured as or otherwise support a means for communicating a portion of the codeword to the host device based at least in part on the read command for the codeword, the portion of the codeword indicating access information for the set of addresses.

In some examples, the receiver 825 may be configured as or otherwise support a means for receiving, from the host device, a read command for data associated with the codeword. In some examples, the driver 850 may be configured as or otherwise support a means for communicating the data to the host device based at least in part on the read command for the data, where communication of the data and communication of the portion of the codeword at least partially overlap in time. In some examples, the command is a write command or a read command. In some examples, the address is a column address or a row address.

Figure 9:
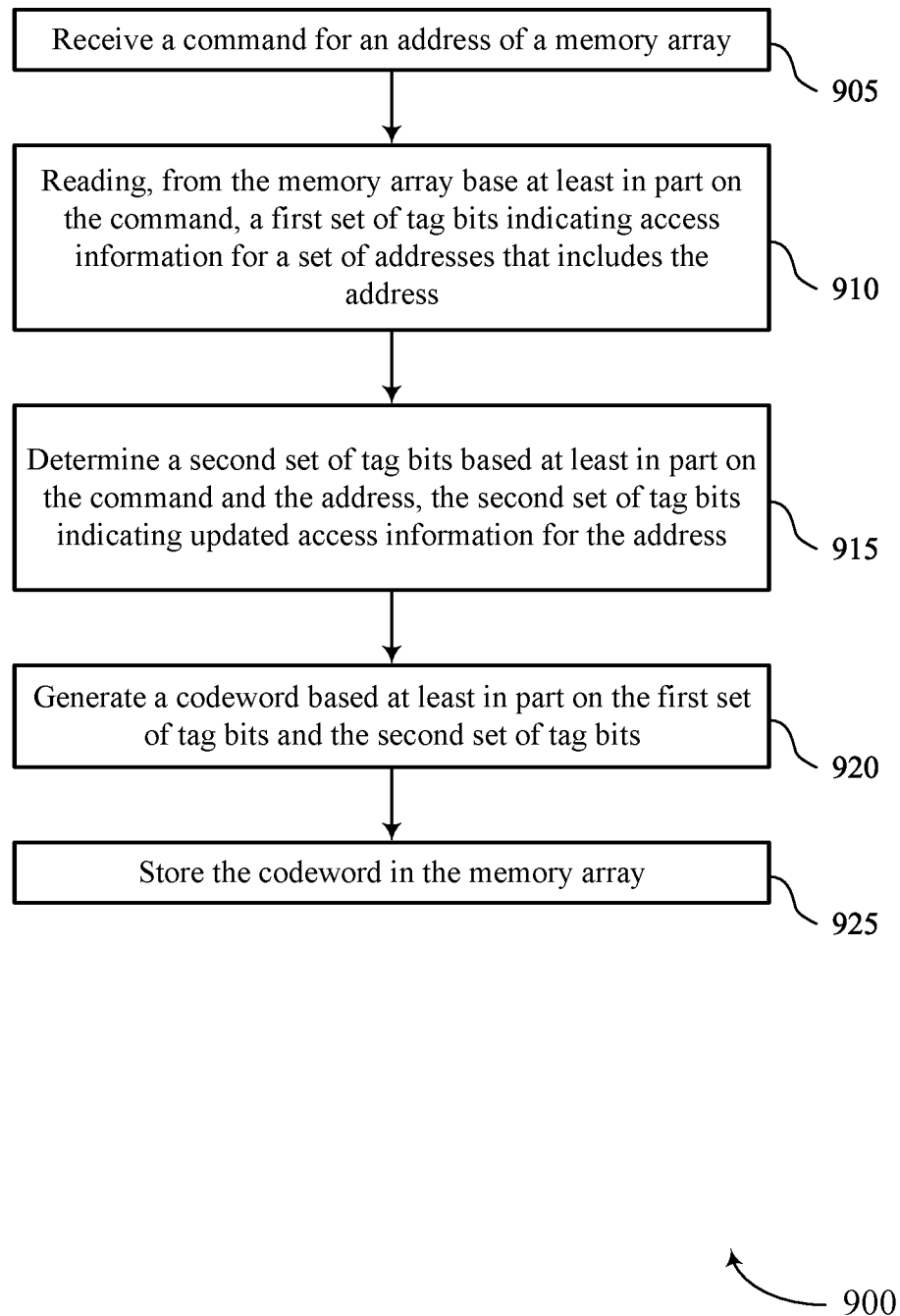
FIG. 9 shows a flowchart illustrating a method or methods that support managing address access information in accordance with examples as disclosed herein.

FIG. 9 shows a flowchart illustrating a method 900 that supports managing address access information in accordance with examples as disclosed herein. The operations of method 900 may be implemented by a device or its components as described herein. For example, the operations of method 900 may be performed by a device as described with reference to FIGS. 1 through 8. In some examples, a device may execute a set of instructions to control the functional elements of the device to perform the described functions. Additionally or alternatively, the device may perform aspects of the described functions using special-purpose hardware.

At 905, the method may include receiving a command for an address of a memory array. The operations of 905 may be performed in accordance with examples as disclosed herein. In some examples, aspects of the operations of 905 may be performed by a receiver 825 as described with reference to FIG. 8.

At 910, the method may include reading, from the memory array based at least in part on the command, a first set of tag bits (e.g., stored tag bits) indicating access information for a set of addresses that includes the address. The operations of 910 may be performed in accordance with examples as disclosed herein. In some examples, aspects of the operations of 910 may be performed by a sensing circuitry 830 as described with reference to FIG. 8.

At 915, the method may include determining a second set of tag bits (e.g., generated tag bits) based at least in part on (e.g., in response to, as a function of) the command and the address, the second set of tag bits indicating updated access information for the address. The operations of 915 may be performed in accordance with examples as disclosed herein. In some examples, aspects of the operations of 915 may be performed by a decoder 835 as described with reference to FIG. 8.

At 920, the method may include generating a codeword based at least in part on (e.g., using) the first set of tag bits and the second set of tag bits. The operations of 920 may be performed in accordance with examples as disclosed herein. In some examples, aspects of the operations of 920 may be performed by an ECC engine 840 as described with reference to FIG. 8.

At 925, the method may include storing the codeword in the memory array. The operations of 925 may be performed in accordance with examples as disclosed herein. In some examples, aspects of the operations of 925 may be performed by a sensing circuitry 830 as described with reference to FIG. 8.

In some examples, an apparatus as described herein may perform a method or methods, such as the method 900. The apparatus may include, features, circuitry, logic, means, or instructions (e.g., a non-transitory computer-readable medium storing instructions executable by a processor) for receiving a command for an address of a memory array, reading, from the memory array based at least in part on the command, a first set of tag bits indicating access information for a set of addresses that includes the address, determining a second set of tag bits based at least in part on the command and the address, the second set of tag bits indicating updated access information for the address, generating a codeword based at least in part on the first set of tag bits and the second set of tag bits, and storing the codeword in the memory array.

Some examples of the method 900 and the apparatus described herein may further include operations, features, circuitry, logic, means, or instructions for combining, before generating the codeword, the first set of tag bits with the second set of tag bits to update the first set of tag bits. In some examples of the method 900 and the apparatus described herein, generating the codeword may include operations, features, circuitry, logic, means, or instructions for performing ECC encoding on the updated first set of tag bits, where the codeword includes the updated first set of tag bits and a set of parity bits based at least in part on updated first set of tag bits.

In some examples of the method 900 and the apparatus described herein, determining the second set of tag bits may include operations, features, circuitry, logic, means, or instructions for selecting a value for a tag bit corresponding to the address based at least in part on the command, where the second set of tag bits includes the tag bit.

Some examples of the method 900 and the apparatus described herein may further include operations, features, circuitry, logic, means, or instructions for receiving a pre-charge command after the write command, where the codeword may be stored in the memory array based at least in part on receiving the pre-charge command. Some examples of the method 900 and the apparatus described herein may further include operations, features, circuitry, logic, means, or instructions for latching the codeword in a set of latching components before storing the codeword in the memory array.

Some examples of the method 900 and the apparatus described herein may further include operations, features, circuitry, logic, means, or instructions for communicating the codeword from the set of latching components to a set of amplifier components coupled with the memory array and using the set of amplifier components to store the codeword in the memory array based at least in part on communicating the codeword.

Some examples of the method 900 and the apparatus described herein may further include operations, features, circuitry, logic, means, or instructions for performing ECC decoding on the first set of tag bits and a set of parity bits for the first set of tag bits, where the codeword may be generated based at least in part on performing the ECC decoding. Some examples of the method 900 and the apparatus described herein may further include operations, features, circuitry, logic, means, or instructions for writing the codeword to the set of memory cells.

Some examples of the method 900 and the apparatus described herein may further include operations, features, circuitry, logic, means, or instructions for communicating the first set of tag bits to an ECC engine, communicating the second set of tag bits to the ECC engine, and combining the first set of tag bits with the second set of tag bits based at least in part on communicating the first and second sets of tag bits to the ECC engine.

Some examples of the method 900 and the apparatus described herein may further include operations, features, circuitry, logic, means, or instructions for receiving, from a host device, a read command for the codeword and communicating a portion of the codeword to the host device based at least in part on the read command for the codeword, the portion of the codeword indicating access information for the set of addresses.

Some examples of the method 900 and the apparatus described herein may further include operations, features, circuitry, logic, means, or instructions for receiving, from the host device, a read command for data associated with the codeword and communicating the data to the host device based at least in part on the read command for the data, where communication of the data and communication of the portion of the codeword at least partially overlap in time. In some examples of the method 900 and the apparatus described herein, the command may be a write command or a read command, and the address may be a column address or a row address.

It should be noted that the methods described herein describe possible implementations, and that the operations and the steps may be rearranged or otherwise modified and that other implementations are possible. Further, portions from two or more of the methods may be combined.

Another apparatus is described. The apparatus may include amplifier components configured to sense, from a memory array and based at least in part on a command for an address of the memory array, a first set of tag bits that indicate access information for a set of addresses that includes the address, a decoder configured to determine a second set of tag bits based at least in part on the command and the address, the second set of tag bits indicating updated access information for the address, an ECC engine configured to generate a codeword based at least in part on the first set of tag bits and the second set of tag bits, and latching components configured to latch the codeword for storage at the memory array.

In some examples of the apparatus, the ECC engine may be different than a second ECC engine configured to perform ECC operations on data bits stored in the memory array. In some examples of the apparatus, the ECC engine may be configured to combine, before generating the codeword, the first set of tag bits with the second set of tag bits to update the first set of tag bits.

In some examples, the apparatus may include perform ECC encoding on the updated first set of tag bits, where the codeword includes the updated first set of tag bits and a set of parity bits based at least in part on updated first set of tag bits. In some examples, the apparatus may include select a value for a tag bit corresponding to the address based at least in part on the command, where the second set of tag bits includes the tag bit.

In some examples of the apparatus, the amplifier components may be configured to store the codeword in the memory array based at least in part on a pre-charge command. In some examples of the apparatus, the amplifier components may be configured to communicate the codeword to the amplifier components, and the amplifier components may be configured to store the communicated codeword in the memory array.

In some examples of the apparatus, the ECC engine may be configured to perform ECC decoding on the first set of tag bits and a set of parity bits for the first set of tag bits, and the codeword may be generated based at least in part on performing the ECC decoding. In some examples of the apparatus, the amplifier components may be configured to communicate the first set of tag bits to the ECC engine, the decoder may be configured to communicate the second set of tag bits to the ECC engine, and the ECC engine may be configured to combine the first and second sets of tag bits.

Another apparatus is described. The apparatus may include a memory array and a controller coupled with the memory array, the controller configured to cause the apparatus to receive a command for an address of a memory array, read, from the memory array based at least in part on the command, a first set of tag bits indicating access information for a set of addresses that includes the address, determine a second set of tag bits based at least in part on the command and the address, the second set of tag bits indicating updated access information for the address, generate a codeword based at least in part on the first set of tag bits and the second set of tag bits, and store the codeword in the memory array.

In some examples, the apparatus may include receive, from a host device, a read command for the codeword and communicate a portion of the codeword to the host device based at least in part on the read command for the codeword, the portion of the codeword indicating access information for the set of addresses. In some examples, the apparatus may include receive, from the host device, a read command for data associated with the codeword and communicate the data to the host device based at least in part on the read command for the data, where communication of the data and communication of the portion of the codeword at least partially overlap in time.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving a command for an address of a memory array;
   decoding, by a decoder, the address of the memory array based at least in part on the command;
   reading, from the memory array based at least in part on the command, a first set of tag bits indicating access information for a set of addresses that includes the address;
   generating, by the decoder, a second set of tag bits based at least in part on the command and the decoded address, the generated second set of tag bits indicating updated access information for the decoded address;
   generating, by a first error correction code (ECC) engine, a codeword based at least in part on the first set of tag bits and the generated second set of tag bits, wherein the first ECC engine is different than a second ECC engine configured to perform ECC operations on data bits stored in the memory array; and
   storing the codeword in the memory array.

2. The method of claim 1, further comprising:
   combining, before generating the codeword, the first set of tag bits with the generated second set of tag bits to update the first set of tag bits.

3. The method of claim 2, wherein generating the codeword comprises:
   performing ECC encoding on the updated first set of tag bits, wherein the codeword comprises the updated first set of tag bits and a set of parity bits that is based at least in part on the updated first set of tag bits.

4. The method of claim 1, wherein generating the second set of tag bits comprises:
   selecting a value for a tag bit corresponding to the decoded address based at least in part on the command, wherein the generated second set of tag bits includes the tag bit.

5. The method of claim 1, further comprising:
   receiving a pre-charge command after the command, wherein the codeword is stored in the memory array based at least in part on receiving the pre-charge command.

6. The method of claim 1, further comprising:
   latching the codeword in a set of latching components before storing the codeword in the memory array.

7. The method of claim 6, further comprising:
   communicating the codeword from the set of latching components to a set of amplifier components coupled with the memory array; and
   using the set of amplifier components to store the codeword in the memory array based at least in part on communicating the codeword.

8. The method of claim 1, further comprising:
   performing ECC decoding on the first set of tag bits and a set of parity bits for the first set of tag bits, wherein the codeword is generated based at least in part on performing the ECC decoding.

9. The method of claim 1, wherein the first set of tag bits and parity bits for the first set of tag bits are read from a set of memory cells, and wherein storing the codeword comprises:
   writing the codeword to the set of memory cells.

10. The method of claim 1, further comprising:
    communicating the first set of tag bits to the first ECC engine;
    communicating the generated second set of tag bits to the first ECC engine; and
    combining the first set of tag bits with the generated second set of tag bits based at least in part on communicating the first set of tag bits and the generated second set of tag bits to the first ECC engine.

11. The method of claim 1, further comprising:
    receiving, from a host device, a read command for the codeword; and
    communicating a portion of the codeword to the host device based at least in part on the read command for the codeword, the portion of the codeword indicating access information for the set of addresses.

12. The method of claim 11, further comprising:
    receiving, from the host device, a read command for data associated with the codeword; and
    communicating the data to the host device based at least in part on the read command for the data, wherein communication of the data and communication of the portion of the codeword at least partially overlap in time.

13. The method of claim 1, wherein the command is a write command or a read command, and wherein the address is a column address or a row address.

14. An apparatus, comprising:
    amplifier components configured to sense, from a memory array and based at least in part on a command for an address of the memory array, a first set of tag bits that indicate access information for a set of addresses that includes the address;
    a decoder configured to decode the address of the memory array based at least in part on the command and configured to generate a second set of tag bits based at least in part on the command and the decoded address, the generated second set of tag bits indicating updated access information for the decoded address;
    a first error correction code (ECC) engine configured to generate a codeword based at least in part on the first set of tag bits and the generated second set of tag bits, wherein the first ECC engine is different than a second ECC engine configured to perform ECC operations on data bits stored in the memory array; and
    latching components configured to latch the codeword for storage at the memory array.

15. The apparatus of claim 14, wherein the first ECC engine is configured to combine, before generating the codeword, the first set of tag bits with the generated second set of tag bits to update the first set of tag bits.

16. The apparatus of claim 14, wherein the first ECC engine is configured to generate the codeword by being configured to:
    perform ECC encoding on the updated first set of tag bits, wherein the codeword comprises the updated first set of tag bits and a set of parity bits that is based at least in part on the updated first set of tag bits.

17. The apparatus of claim 14, wherein the decoder is configured to generate the second set of tag bits by being configured to:
select a value for a tag bit corresponding to the decoded address based at least in part on the command, wherein the generated second set of tag bits includes the tag bit.

18. The apparatus of claim 14, wherein the amplifier components are configured to store the codeword in the memory array based at least in part on a pre-charge command.

19. The apparatus of claim 14, wherein the amplifier components are configured to communicate the codeword to the amplifier components, and wherein the amplifier components are configured to store the communicated codeword in the memory array.

20. The apparatus of claim 14, wherein the first ECC engine is configured to perform ECC decoding on the first set of tag bits and a set of parity bits for the first set of tag bits, and wherein the codeword is generated based at least in part on performing the ECC decoding.

21. The apparatus of claim 14, wherein the amplifier components are configured to communicate the first set of tag bits to the first ECC engine, the decoder is configured to communicate the generated second set of tag bits to the first ECC engine, and the first ECC engine is configured to combine the first set of tag bits and the generated second set of tag bits.

22. The apparatus of claim 14, wherein the first ECC engine is located closer to the memory array than the second ECC engine.

23. An apparatus, comprising:
a memory array; and
a controller coupled with the memory array, the controller configured to cause the apparatus to:
receive a command for an address of the memory array;
decode, by a decoder, the address of the memory array based at least in part on the command;
read, from the memory array based at least in part on the command, a first set of tag bits indicating access information for a set of addresses that includes the address;
generate, by the decoder, a second set of tag bits based at least in part on the command and the decoded address, the generated second set of tag bits indicating updated access information for the decoded address;
generate, by a first error correction code (ECC) engine, a codeword based at least in part on the first set of tag bits and the generated second set of tag bits, wherein the first ECC engine is different than a second ECC engine configured to perform ECC operations on data bits stored in the memory array; and
store the codeword in the memory array.

24. The apparatus of claim 23, wherein the controller is further operable to cause the apparatus to:
receive, from a host device, a read command for the codeword; and
communicate a portion of the codeword to the host device based at least in part on the read command for the codeword, the portion of the codeword indicating access information for the set of addresses.

25. The apparatus of claim 24, wherein the controller is further operable to cause the apparatus to:
receive, from the host device, a read command for data associated with the codeword; and
communicate the data to the host device based at least in part on the read command for the data, wherein communication of the data and communication of the portion of the codeword at least partially overlap in time.

* * * * *